US008360646B2

(12) United States Patent
McNaughton et al.

(10) Patent No.: US 8,360,646 B2
(45) Date of Patent: Jan. 29, 2013

(54) SLUDGE AND SEDIMENT REMOVAL SYSTEM BY REMOTE ACCESS

(75) Inventors: Jerry McNaughton, Houston, TX (US); Stanley W. Ellis, Bakersfield, CA (US)

(73) Assignee: Sierra Process Systems, Inc., Bakersfield, CA (US)

( * ) Notice: Subject to any disclaimer, the term of this patent is extended or adjusted under 35 U.S.C. 154(b) by 0 days.

(21) Appl. No.: 13/093,526

(22) Filed: Apr. 25, 2011

(65) Prior Publication Data

US 2011/0198815 A1 Aug. 18, 2011

Related U.S. Application Data

(62) Division of application No. 11/357,660, filed on Feb. 16, 2006, now Pat. No. 7,950,530.

(51) Int. Cl.
*F16C 23/04* (2006.01)

(52) U.S. Cl. .......................... 384/145; 384/192; 384/206

(58) Field of Classification Search .................. 384/145, 384/146, 192, 206–212; 285/138.1, 355, 285/146.1–146.3; 277/506, 507
See application file for complete search history.

(56) References Cited

U.S. PATENT DOCUMENTS

| | | | | | |
|---|---|---|---|---|---|
| 343,769 | A | * | 6/1886 | Levi | 277/507 |
| 783,301 | A | * | 2/1905 | McMillan | 285/138.1 |
| 1,437,372 | A | * | 11/1922 | Walters | 137/579 |
| 2,286,122 | A | * | 6/1942 | Stapp | 285/94 |
| 3,028,183 | A | * | 4/1962 | Phillips | 403/69 |
| 3,133,754 | A | * | 5/1964 | Peters | 285/145.5 |
| 3,240,502 | A | * | 3/1966 | Snyder | 277/507 |
| 4,129,306 | A | * | 12/1978 | Konno et al. | 277/507 |
| 4,480,842 | A | * | 11/1984 | Mahyera et al. | 277/329 |
| 4,834,394 | A | * | 5/1989 | Katz et al. | 277/507 |
| 5,286,063 | A | * | 2/1994 | Huston | 285/11 |

* cited by examiner

*Primary Examiner* — Thomas R Hannon

(74) *Attorney, Agent, or Firm* — Kilpatrick Townsend & Stockton LLP.; M. Henry Heines

(57) ABSTRACT

A compound conduit containing inner and outer conduits with apertures in the former that are angled to direct jets of fluid in a rearward direction from the inner conduit into the annular space is used to draw sludge or undesirable material from a vessel without imposing a vacuum on the system. In conjunction with the compound conduit is a rotary tube seal that allows the conduit to be mounted to an orifice in a tank wall and pivoted or rotated over a range of angles. A tubing drive mechanism grasps the tubing at locations well removed from the distal end and causes the tubing to travel in the direction of the tubing axis. The gripping members in the mechanism engage the sides of the tubing and are capable of shifting position relative to each other to accommodate changes in the curvature of the tubing.

3 Claims, 7 Drawing Sheets

SLUDGE AND SEDIMENT REMOVAL SYSTEM BY REMOTE ACCESS

CROSS-REFERENCE TO RELATED APPLICATION

This application is a division of U.S. patent application Ser. No. 11/357,660, filed Feb. 16, 2006, now U.S. Pat. No. 7,950, 530. The contents of patent application Ser. No. 11/357,660 are incorporated herein in their entirety.

BACKGROUND OF THE INVENTION

1. Field of the Invention

This invention resides in the field of equipment used in the cleaning of storage tanks, and particularly equipment that removes solids or solid-containing materials such as sludge and that is controlled from the tank exterior.

2. Description of the Prior Art

Liquid storage and process tanks tend to accumulate sludge that must be removed periodically to maintain tank capacity. Similar problems occur in large liquid storage tanks in general, including municipal waste systems. Conventional methods of removing sludge from tanks have involved teams of workers entering the tank and removing the sludge by manual labor. This is a highly labor-intensive process with significant economic loss due to the considerable time in which the tank is empty during the cleaning process.

A variety of mechanical devices have been developed to reduce both the cost and the hazards of sludge removal. These devices include baffles built into the tank to guide the collection and movement of the sludge, ports built into the tank wall and floor, rotating rakes to consolidate the sludge and direct it to draw-off pipes, sloped bottoms, and sumps. Disclosures of some of these methods appear in the following United States patents, each of which is incorporated herein by reference in its entirety: Shaffer, R. L., et al. (Ecodyne Corporation), U.S. Pat. No. 3,951,819, issued Apr. 20, 1976; Allen, H. W., U.S. Pat. No. 5,335,395, issued Aug. 9, 1994; Harris, R. B., U.S. Pat. No. 5,830,355, issued Nov. 3, 1998; Allen, H. W., et al., U.S. Pat. No. 6,141,810, issued Nov. 7, 2000; and Sarrouh, S. F. (Parkson Corporation), U.S. Pat. No. 6,234,323 B1, issued May 22, 2001.

SUMMARY OF THE INVENTION

The present invention resides in various mechanical devices that are useful as components for a sludge removal system and are not suggested by sludge removal systems of the prior art. The devices disclosed herein are useful in combination to form a sludge removal unit, and each device can also be used individually, either alone or with components of systems that are already in the prior art. When used individually, the devices are useful in a variety of contexts, all involving fluid transport through conduits where control of the conduit location, fluid flow rate, or both is achieved by remote access.

One of the devices of the present invention is a compound conduit for extracting solid and semi-solid matter from a vessel. The term “solid matter” in the context of this invention denotes granular solids, solids that can be comminuted to granular form by impact with water jets, and sludges. The term “semi-solid matter” denotes materials that have the consistency of a gel or that are highly viscous. The compound conduit includes inner and outer conduits with an annular space between them and apertures in the wall of the inner conduit that communicate the interior of the inner conduit with the annular space. The distal ends of the inner and outer conduits, and thus the distal end of the compound conduit as a whole, are immersed in the sludge or generally in the vessel from which the solid matter is to be drawn, and the apertures in the wall of the inner conduit are angled away from the distal ends. Fluid passing through the apertures from the interior of the inner conduit into the annular space thus flows toward the proximal ends of the conduit system. The inner conduit can be capped at its distal end to force the pressurized fluid in the inner conduit through the wall apertures. Alternatively, the inner conduit can terminate in an obstruction that resists or limits the passage of fluid out the distal end to cause at least some of the fluid to pass through the wall apertures. By supplying pressurized fluid such as water, steam, foam, air, nitrogen, or liquids and gases in general to the inner conduit through the proximal end of the conduit, therefore, jets of the fluid emerging from the apertures induce a rearward (proximally-directed) flow through the annular space that draws solid matter in through the distal end of the outer conduit and along the length of the outer conduit toward the proximal end.

An optional feature of the construction is an axial aperture at the distal end of the inner conduit, allowing the inner conduit to supply fluid to the surroundings while also drawing solids and fluids into the annular space. Another optional feature is one or more lateral apertures at the distal end of the inner conduit to impart a lateral reaction force to the inner conduit, and thus to the compound conduit as a whole, to steer the distal end in desired directions. The inner conduit can be secured to the outer conduit so that the two will move only as a unit. Preferably, however, the inner conduit can be movably retained within the outer conduit with features allowing the inner conduit to be extended beyond the outer conduit to protrude at the distal end, or to be retracted to reside entirely within the outer conduit. Still further options are position locating, or position signal generating, features at the distal end of the inner conduit, outer conduit, or both, to allow monitoring of the positions of the distal ends of either or both conduits from a remote location.

A second device included in the present invention is a rotatable tube seal that allows a length of tubing to pass through an orifice in the tank wall while preventing escape of liquid from the tank through the orifice. The tube seal includes a generally spherical body with a bore passing through the body, a housing that receives the spherical body and that is mountable to the tank at the orifice, orbital bearings within the housing that allow the body to rotate, and a dynamic sealing contact between the spherical body and the housing. The tube seal can include a coupling fixture that couples the bore to one end of the tubing to form a continuous passage from the tubing through the tube seal and the tank wall. Alternatively, the bore can be large enough to allow the tubing to pass through the bore, and the tubing can either be left free to move axially within the bore or be clamped against the bore to prevent axial movement of the tubing. The freedom of rotation of the spherical body within the housing allows the axis of the bore to form a variable angle with the plane of the orifice, thereby allowing the bore and the tubing passing through the bore to pivot up and down, from side to side, or both, relative to the orifice, and at any angle between the vertical and horizontal.

In a third aspect, the invention resides in a mechanism for imparting motion to a length of tubing in the direction of the longitudinal axis of the tubing regardless of whether the tubing is straight or curved and while curvature of the tubing is changing. The mechanism includes motorized tube drivers that engage the sides of the tubing and drive the tubing along its axis while allowing the axis to assume a range of curvatures. The drivers include grippers in the form of rollers or shoes (gripping blocks that travel with the tubing), the grippers either individually engaging the tubing or mounted to one or more chains positioned along one or both sides of the tubing, but in all cases maintaining contact with the tubing during shifts in the tubing curvature. Drive chains with gripper blocks that can perform this function are disclosed in Perio, Jr., D. J., U.S. Pat. No. 6,609,566 B2, issued Aug. 26, 2003, and Austbo, L. L., et al., U.S. Pat. No. 6,968,894 B2, issued Nov. 29, 2005. The contents of these documents are hereby incorporated herein by reference. The variability in axial curvature of the tubing in the chains disclosed in these documents can be achieved by translational movement of components such as drive sprockets, idler sprockets, and skates. When rollers are used rather than drive chains, one example of an effective arrangement is three pairs of rollers, with a gap between the facing rollers in each pair to receive the tubing which is seized on opposing sides by the rollers on both sides of the gap. The three pairs of rollers are arranged in parallel with one pair in the middle and the remaining two pairs flanking the middle pair, and with the gaps between the three pairs aligned to permit a continuous length of tubing to pass between all three pairs. At least one of the pairs is movable relative to the others so that the gap between the middle pair can be moved out of alignment relative to the gaps between the two end pairs. By varying the position of the roller pairs relative to each other, or in the case of drive chains, by varying the positions of the sprockets or other components that guide the chains, the radius of curvature of the tubing will be varied between an infinite value, i.e., in which the tubing is straight, and finite values in which the tubing is curved to varying degrees. The tubing curvature can also be reversed, i.e., shifted from a positive to a negative radius of curvature.

Whether grippers are shoes mounted to drive chains or rollers, the grippers are driven by one or more motors to move the tubing along its axis. The relative positions of the rollers or the curvature of the drive chains can be controlled by one or more motors or can be achieved in response to the movement of the tubing itself or of components on the support structure to which the rollers or drive chains are mounted. Thus, in certain constructions the positions of the grippers are controlled by the tubing, while in others the curvature of the tubing is controlled by the grippers. The grippers and their associated motors will generally be far removed from the distal end of the tubing, allowing the operator to manipulate the position of the distal end from outside the tank.

The compound conduit, rotatable tube seal, and tube drive mechanism described above can all be combined into a single unit, useful for extracting materials, notably sludges, from a tank or other vessel through a port or orifice in the vessel wall. Alternatively, individual components within the scope of this invention can be combined with components of the prior art that serve functions similar to those of the other components of this invention, although in many cases in a less efficient manner. Still further, individual components of this invention can be used in an application where the functions served by the other components are not needed. Thus, a compound conduit within the scope of this invention can be used without a tube seal or a tube drive mechanism, or with a tube seal other than that described above or with a tube drive mechanism other than that described above, and the same is true for the tube seal and the tube drive mechanism themselves.

Further objects, advantages, and embodiments of the invention and each of its components will be apparent from the description that follows.

DETAILED DESCRIPTION OF THE INVENTION AND PREFERRED EMBODIMENTS

Figure 1:
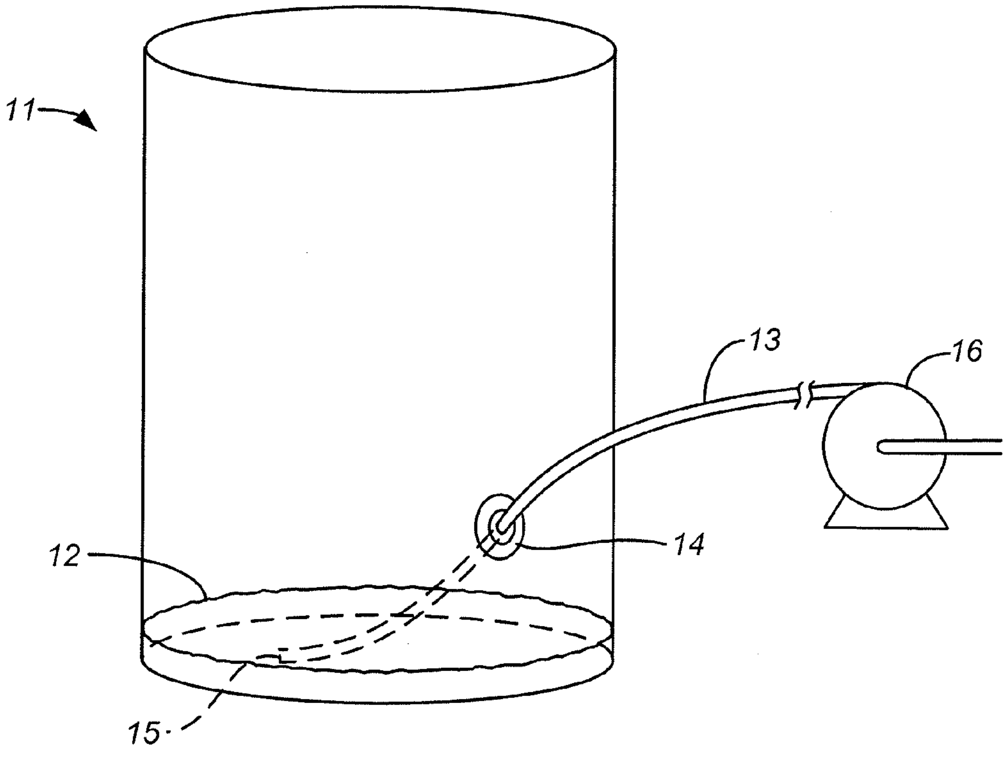
FIG. 1 is a perspective view of a storage tank with sludge to be removed and a conduit in accordance with the invention installed through the tank wall.

Among the various compound conduit constructions that incorporate the features described above, the configurations, number and arrangement of the lateral apertures whose rearward orientation draws sludge into the annular space can vary widely. Individual apertures can be straight passages or engineered passages, such as nozzles with a longitudinal cross section that has a convergent-divergent profile forming a throat. Straight passages will generally suffice. The angle of an individual aperture, i.e., the angle between the aperture axis and the longitudinal axis of the inner conduit, may vary as well, but will generally be an acute angle to produce a rearward flow through the annular space that will draw the sludge near the distal end of the conduit into the annular space. Best results will be obtained in most case with an angle of from about 20° to about 75°, and preferably from about 30° to about 60°. A currently preferred angle is approximately 45°. The aperture diameter will also vary depending on the scale of the system and the dimensions of the conduit itself. A preferred range for the diameter is from about 0.03 inch to about 0.3 inch (approximately equal to the range of 0.075 cm to 0.75 cm), and preferably from about 0.08 inch to about 0.1 inch (approximately equal to the range of 0.2 cm to 0.25 cm). The width of the annular space is preferably from about 1 inch to about 10 inches (approximately 2.5 cm to about 25 cm).

The number of lateral apertures and their spatial arrangement in the wall of the inner conduit can vary as well, depending on the conduit dimensions, including its diameter and length, as well as the aperture sizes. For most applications, apertures ranging from 1 to 20 in number will be sufficient. For stable and approximately uniform fluid flow within the annular space, the apertures are preferably distributed around the circumference of the inner conduit. Thus distributed, the apertures can either be spaced apart longitudinally along the conduit axis or arranged in one or more rings encircling the conduit. In most cases, best results will be obtained with at least one set of apertures arranged in a ring encircling the conduit, the apertures preferably equally spaced around the conduit circumference. For an inner conduit with an outer diameter of from about 0.3 inch to about 3 inches (0.75 cm to 7.5 cm), the preferred number of apertures is from 3 to 20 such apertures per ring. Preferred constructions include a ring of apertures in close proximity to the distal end of the conduit, and optionally one or more additional rings further along the length of the conduit. In most applications, effective results will be obtained with as little as one ring and as many as ten. When multiple rings are present, the conduit will preferably contain from two to ten rings of apertures axially spaced apart by intervals of from a few inches to several feet. In a currently preferred construction, the inner conduit is approximately 0.75 inch to 1.0 inch in outer diameter and contains two rings of six lateral apertures each, the distal ring being within 0.5 inch (1.3 cm) from the distal end of the conduit, and the second ring being approximately 10 ft. to 50 ft. (3.05 m to 15.25 m) from the distal ring. (The conversions in this paragraph are all rounded off to indicate that the ranges are approximate in both the English and metric systems.)

In certain embodiments of the invention, the inner conduit has one or more distal apertures in addition to the lateral apertures, these additional apertures positioned and oriented for purposes other than drawing solids or sludge into the annular space and propelling them rearward. The distal aperture or apertures can be formed by perforations in a cap that otherwise seals the distal end of the inner conduit, and will generally be small enough relative to the lateral apertures that a substantial amount, preferably more than half, of the pressurized fluid supplied to the inner conduit is ejected through the lateral apertures. A distal aperture that is axially oriented, i.e., one that directs a stream or spray of fluid out the distal end along the conduit axis, can serve to loosen or dilute the solid matter in the vessel and thereby facilitate that flow of the sludge or granulated solids into and through the annular space. Another function that can be served by one or more distal apertures is directional steering of the inner conduit, and hence of the entire compound conduit. Directional steering by a lateral reaction force on the conduit can be achieved by apertures that are laterally oriented, i.e., transverse to the conduit axis, directing a stream to one side of the conduit and thereby imposing a reaction force on the conduit in the opposite direction. Changes in direction can be achieved by rotation of the conduit about its axis.

A still further feature that is included in certain compound conduits of this invention is a contoured profile of the outer conduit to control or enhance the flow of fluid entering or inside the annular space. The distal end of the outer conduit can for example have a convergent-divergent profile, i.e., one in which the under diameter of the conduit decreases from the distal end to a throat located at a short distance inside the conduit, and then expands proximal to the throat. This profile causes the distal end of the outer conduit to function as a convergent-divergent nozzle, with a pressure drop across the throat to increase the flow rate through the annular space. The position locating feature mentioned above can be used in conjunction with the steering to navigate the conduit through the vessel. Position locating can be achieved by sonar, radar, infrared imaging, and various other imaging and navigating devices known in the art.

The dimensions of the compound conduit as a whole and the materials of construction of the conduit can vary. Optimal dimensions for any particular application will depend on the nature of the material to be drawn through the conduit, the size and shape of the vessel from which the material is to be drawn, and possibly economic considerations. The choice of construction material can also depend on the nature of the sludge in the vessel, notably its corrosiveness, as well as the size and configuration of the vessel and therefore how much flexibility is needed. A currently contemplated range for the length of the compound conduit is from about 30 feet to about 500 feet (9 m to 152 m), preferably from about 100 feet to about 350 feet (30 m to 107 m), with the outer conduit having an outer diameter ranging from about 1 inch to about 10 inches (2.5 cm to 25 cm) and preferably from about 3 inches to about 6 inches (7.6 cm to 15.2 cm). Again, all conversions herein are approximate. For corrosive applications, the conduit material can be high-alloy stainless steel.

Turning next to the rotatable tubing seal, the features of the seal construction are likewise designed to facilitate its use in a variety of applications. The orbital bearing that permits the spherical body to rotate within the housing is one that permits the tubing that passes through the seal to rotate about the tubing axis and also permits the tubing axis itself to gyrate, i.e., to describe a cone on either side of the mount and to assume all angles within the cone. Bearings that function in this manner include ball bearings as well as lubricated or self-lubricated packing materials and pressure-sensitive dynamic packings such as multiple-lip (chevron) packings. The orbital bearing itself can provide the seal that blocks the passage of fluid between the spherical body and the housing. One or more additional dynamic seals, such as O-rings, can also be included. In embodiments in which the tubing passes through the bore in the spherical body rather than being coupled to the spherical body, a conventional packing can be inserted between the tubing and the bore as a dynamic seal to prevent the flow of fluid around the tubing. Examples are O-rings, multiple-lip (chevron) packings, inflatable packings, and in general any resilient material.

Turning finally to the tube drive and bending mechanism, a currently preferred embodiment of this feature is the roller arrangement described above. The changes in alignment of the rollers can be made by the rollers themselves or can be achieved in response to external forces imposed on the tubing. In either case, the rollers are preferably mounted to a common frame by movable mounts that allow the rollers to remain in full contact with the tubing during all changes in the tubing curvature. Maintenance of full contact can be achieved by a resilient mounting of the rollers to the frame such as, for example, through cylinder mounts, coil springs, or other spring-loaded or generally biased connections such as accumulators and pressure-control circuits. For purposes of driving the tubing, the number of rollers that is motor driven can be as little as one. Preferably, however, at least one roller in each pair is motor-driven, and for applications where a strong driving force is needed, all six rollers can be motor-driven. The mechanism can also include more than three pairs of rollers, although three pairs will generally be sufficient and are preferred for purposes of economy. Any conventional motor capable of driving a roller, preferably a high-torque, low-speed motor, can be used. Hydraulic motors are examples of such motors, including those known in the industry as “gerotors.”

While each of the components of the invention is susceptible to a wide range of variations, a full understanding of the principles and concepts that form the novelty of each component can be obtained from a detailed review of specific embodiments. The Figures hereto depict such embodiments.

FIG. 1 depicts a tank 11 in which sludge 12 has settled to the bottom. A compound conduit 13 in accordance with the present invention enters the tank through an orifice 14 in the tank wall, the distal end 15 of the conduit extending into the sludge. A pump 16 supplies pressurized water to the compound conduit through the inner conduit (not visible in this Figure). Manipulation of the conduit 13 and control of the extraction of sludge through conduit are both achieved from outside the tank.

Figure 2:
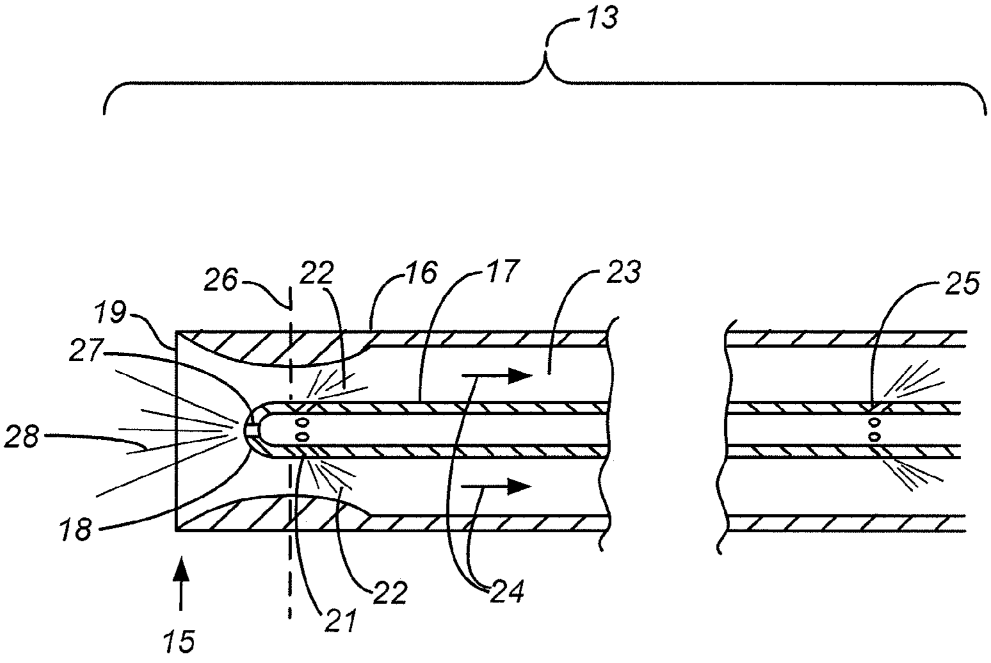
FIG. 2 is a cross section of segments of a compound conduit in accordance with the present invention.

The compound conduit 13 is depicted in cross section in two segments in FIG. 2. The segment on the left side of the Figure is the distal end 15 of the compound conduit and the segment on the right side is a segment located a short distance from the distal end. The components of the compound conduit 13 are the outer conduit 16 and the inner conduit 17, and in the configuration shown, the distal end 18 of the inner conduit 17 is retracted slightly relative to the distal end 19 of the outer conduit 16. Near the distal end 18 of the inner conduit are a series of lateral apertures 21, arranged in a ring encircling the inner conduit. When the inner conduit filled with pressurized fluid, each aperture produces a jet 22 of the fluid into the annular space 23. The rearward orientation of the lateral apertures 21 directs the fluid jets 22 toward the proximal end of the compound conduit (not shown), drawing sludge into the annular space through the open distal end 19 of the outer conduit and causing the sludge to flow through the annular space in the direction indicted by the arrows 24. A second ring of lateral apertures 25 is located in the proximal segment, these apertures likewise having rearwardly directed angles to produce jets that are similarly directed rearward, adding further to the extraction force drawing the sludge through the annular space 23. The distal segment of the outer conduit 16 has a contoured profile converging from distal end 19 to a throat 26 and diverging proximal to the throat. This profile adds still further to the force of fluid flowing through the annular space 23. At the tip of the distal end 18 of the inner conduit is an axial aperture 27 which directs a jet 28 outward into the sludge.

Figure 3:
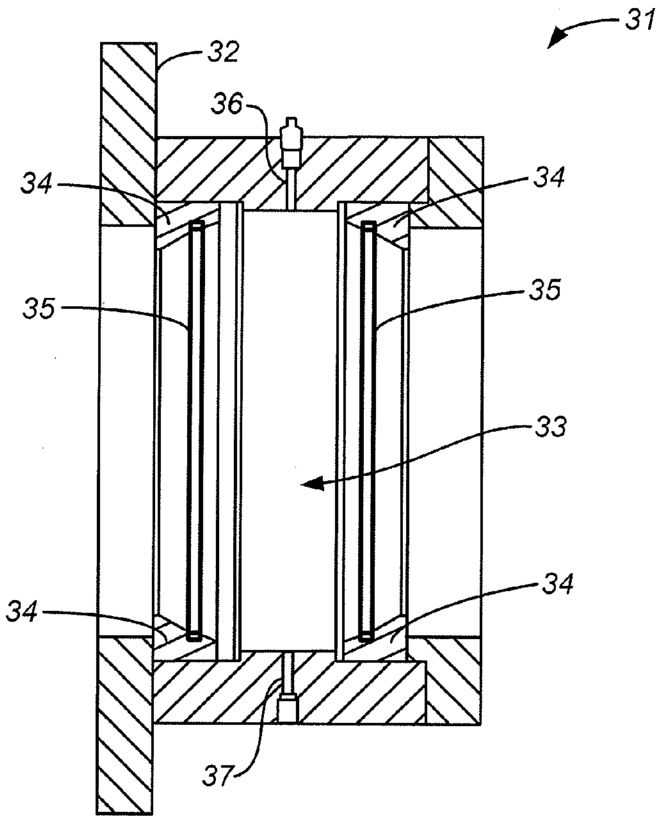
FIG. 3 is a cross section of a housing for a tube seal in accordance with the present invention.
Figure 4:
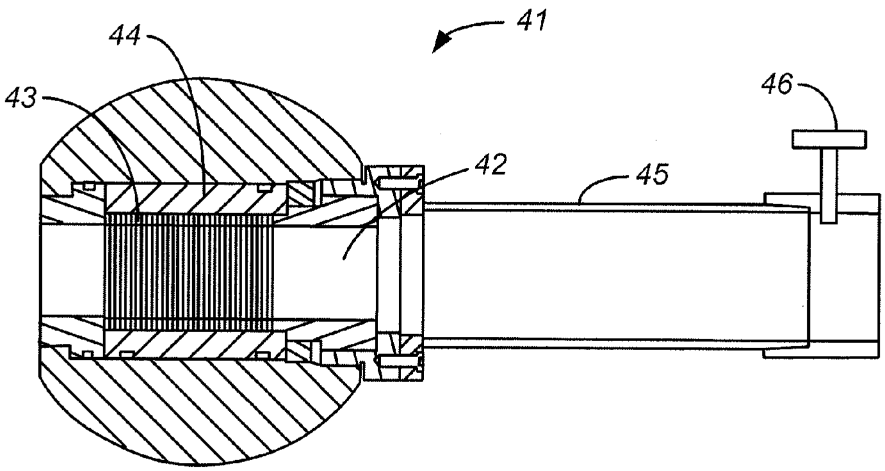
FIG. 4 is a cross section of a spherical body for placement within the housing of FIG. 3 in accordance with the invention.
Figure 5:
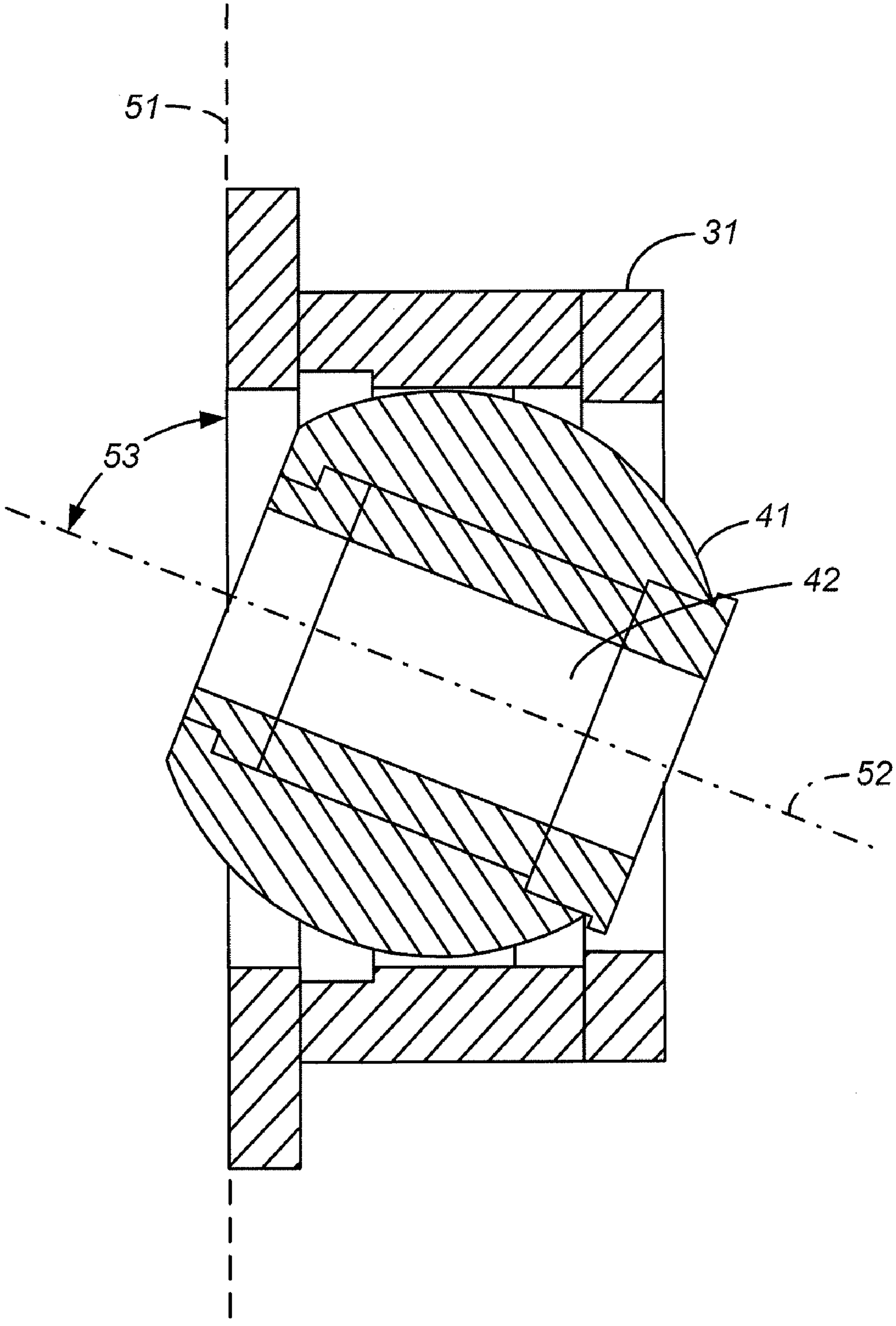
FIG. 5 is an assembly drawing of the housing of FIG. 3 and the spherical body of FIG. 4 combined.

A rotary tube seal in accordance with the invention is depicted in FIGS. 3, 4, and 5. All bolts and similar connecting hardware have been eliminated from these drawings for clarity. FIG. 3 is a cross section of the housing 31 that forms part of the tube seal. The housing is mounted to the wall of the vessel by way of a mounting flange 32 bolted and sealed around an orifice in the wall. The housing contains a central cavity 33, and retained within the cavity are orbital bearings 34. In the wall of the cavity are grooves 35 to accommodate O-rings for sealing the gap between the cavity wall and the spherical body while allowing the spherical body to rotate. Ports 36, 37 in the housing wall allow lubricant to be added.

FIG. 4 is a cross section of the spherical body 41. Since the body does not rotate a full 360°, the body is a truncated sphere for convenience in accommodating fittings that are mounted to the body. A bore 42 passes through the spherical body to receive the tubing, and central to the bore is a series of packing seal rings 43 held in place by a packing sleeve 44. Also shown are various miscellaneous fittings such as bushings and nuts. A short length of pipe 45 extends from the outer end of the bore 42 to receive the tubing (not shown), which passes through the pipe and the bore. A secondary safety valve 46 is installed in the short length of pipe 45 for pressure reduction or for the supply of hydraulic oil to components within the mechanism.

A cross section of the assembled tube seal appears in FIG. 5. For simplicity, the spherical body 41 is shown in this Figure without the pipe extension 45 of FIG. 4. The plane of the vessel wall in which the tube seal will reside is indicated by the vertical dashed line 51, and the axis 52 of the bore 42 through the spherical body 41 is likewise shown. The angle 53 between the axis 52 and the wall 51 will vary as the spherical body is rotated.

Figure 6:
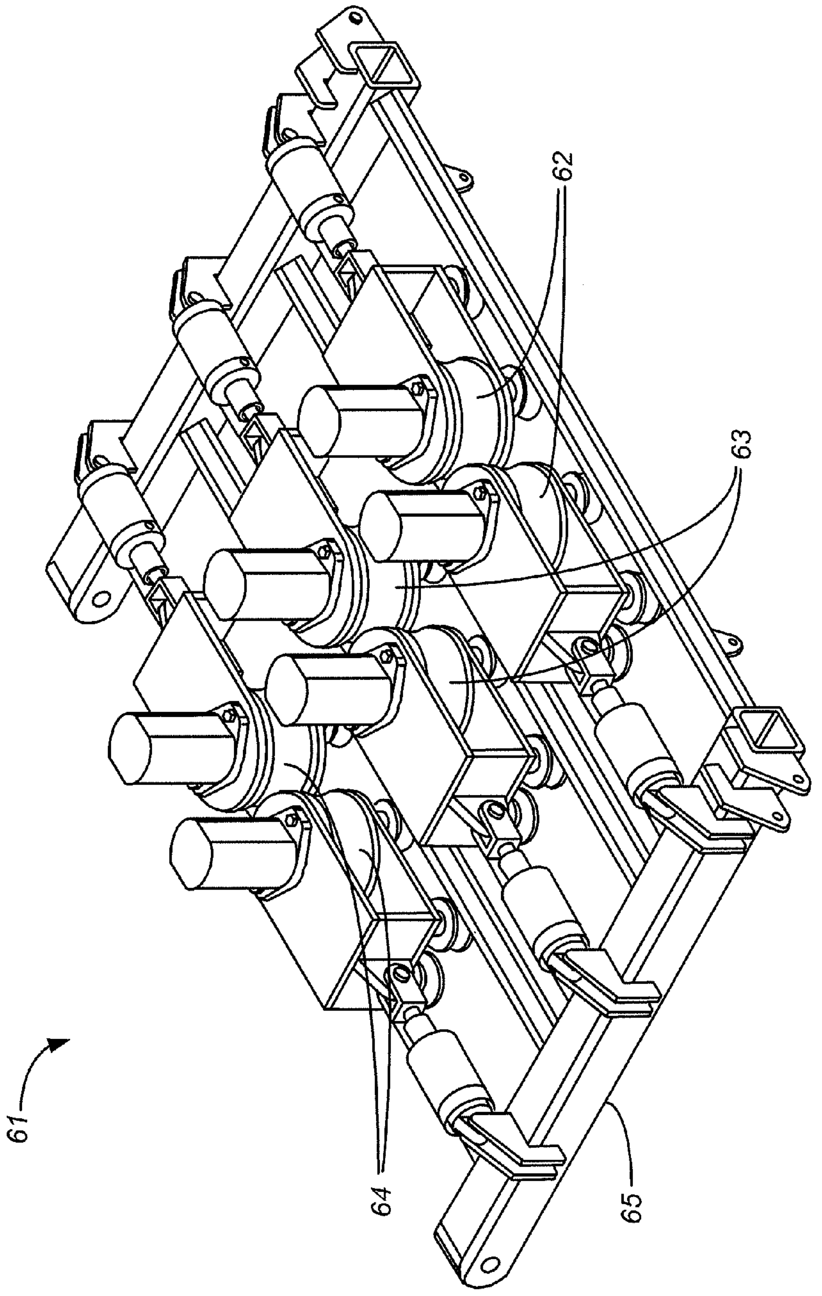
FIG. 6 is a perspective view of a tube driving mechanism in accordance with the invention.
Figure 7:
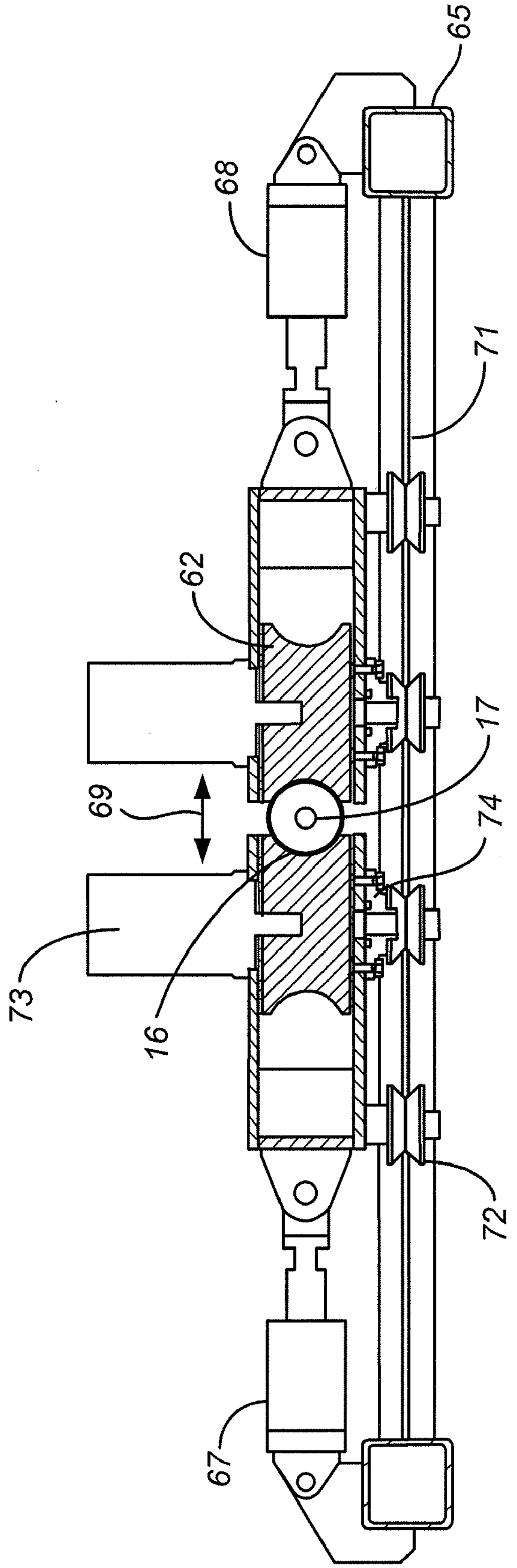
FIG. 7 is a cross section of the drive mechanism of FIG. 6 through one pair of rollers.

FIG. 6 is a perspective view of a roller-based tubing drive 61, showing three pairs of rollers 62, 63, 64 mounted in a parallel configuration, i.e., the line connecting the centers of the rollers in each individual pair is parallel to the lines connecting the centers of the rollers in each of the remaining pairs. The rack 65 to which the rollers are mounted allows the rollers to move relative to each other while maintaining their parallel configuration. FIG. 7 is a side view of one of the roller pairs 62. The lateral surfaces of the rollers are concave to conform in contour to the outer surface of the outer conduit 16 which passes through the gap between the rollers. The rollers are mounted to the rack 65 through hydraulic cylinders 67, 68, allowing the rollers to move back and forth along the line connecting their centers, i.e., along the direction of the arrow 69. Alternatives to the hydraulic cylinders 67 are linear actuators and mechanical turn buckles. Guide rails 71 and guide rollers 72 restrict the movement of the rollers to the direction of the arrow 69, thereby maintaining the different roller pairs in a parallel arrangement, by which are to be differentiated from the tube rollers 62. Each tube roller is rotated by a drive motor and gear box 73, and conventional bearings 74 allow the tube rollers 62 to rotate.

Figure 8:
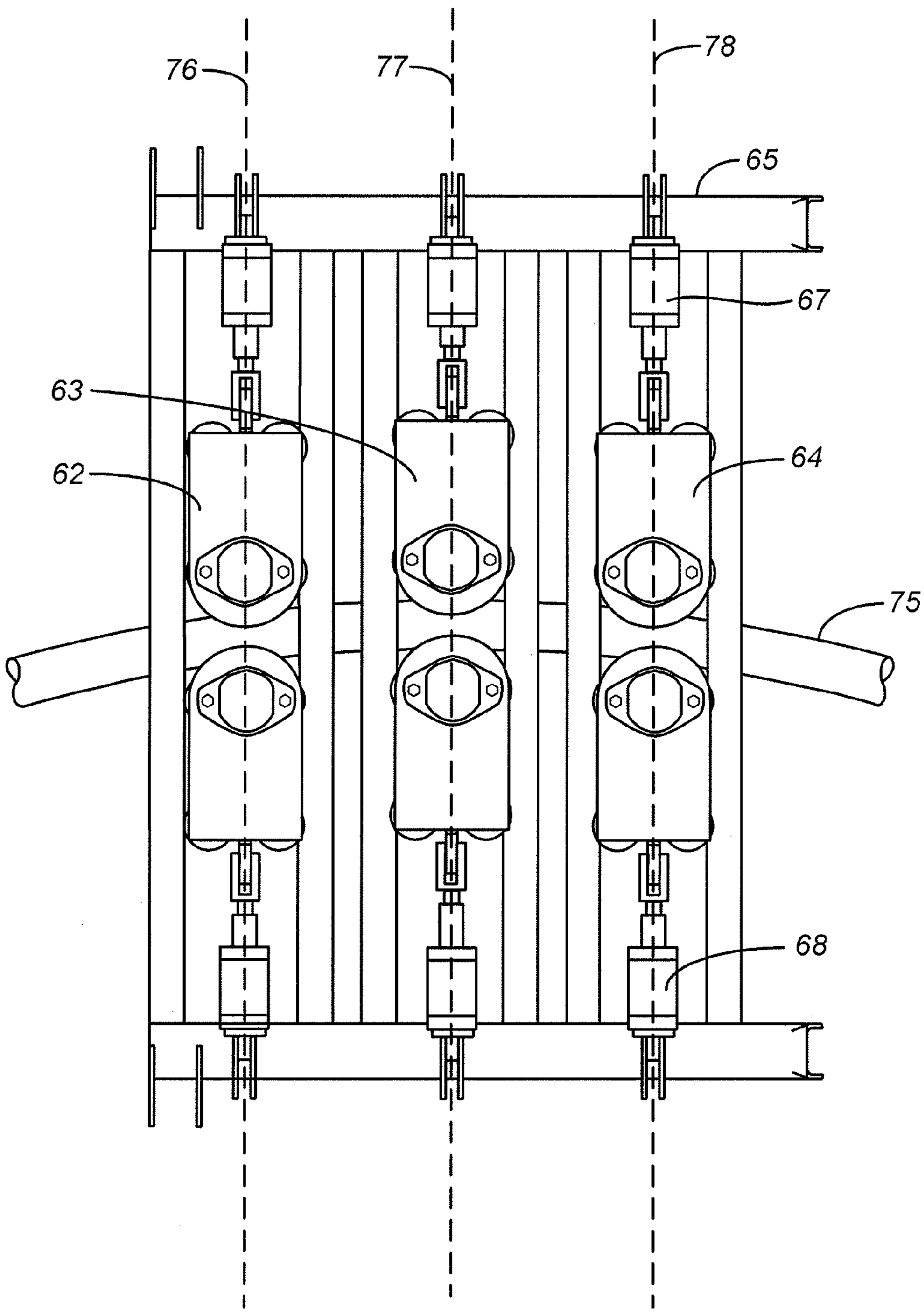
FIG. 8 is a top view of the tube driving mechanism of FIG. 6.

FIG. 8 is a top view of the tube rollers and rack, showing a length of tubing 75 passing between the three pairs in succession. The parallel lines connecting the centers of the rollers of each pair are depicted in dashed lines 76, 77, 78. In the configuration shown, the middle cylinder pair 63 is shifted slightly relative to the two end pairs 62, 64 without bringing the lines 76, 77, 78 out of their parallel relation. This shift of the middle pair 63 causes the gaps between the roller pairs to be out of alignment, such that when the tubing is curved as shown, all rollers remain in contact with the tubing. The cylinders are air cylinders to prevent sudden movement and thereby protect the tubing against breakage.

Further variations, substitutions, and modifications, all still embodying the central concepts and features of the invention, will be readily apparent to those skilled in the art.

What is claimed is:

1. A rotatable tube seal for a tank wall orifice, said tube seal comprising:

a generally spherical body with a bore therethrough;

a housing sized to receive said body and configured to maintain a continuous passage through said rotatable tube seal during rotation of said body relative to said housing;

orbital bearings between said housing and said body to retain said body within said housing while permitting rotation of said body relative to said housing;

dynamic sealing means for forming a seal to prevent fluid passage between said body and said housing and for maintaining said seal during rotation of said body; and tank mounting means for mounting said housing to an orifice in a tank wall.

2. The rotatable tube seal of claim 1 wherein said generally spherical body is a truncated sphere.

3. The rotatable tube seal of claim 1 further comprising packing within said bore to enable placement of tubing within said bore while preventing fluid passage between tubing so placed and said bore.

* * * * *